US008345170B2

(12) United States Patent
Iwata et al.

(10) Patent No.: US 8,345,170 B2
(45) Date of Patent: Jan. 1, 2013

(54) DISPLAY DEVICE AND ITS CONTROL METHOD

(75) Inventors: Keisuke Iwata, Osaka (JP); Tsuyoshi Ide, Osaka (JP)

(73) Assignee: Panasonic Corporation, Osaka (JP)

(*) Notice: Subject to any disclaimer, the term of this patent is extended or adjusted under 35 U.S.C. 154(b) by 882 days.

(21) Appl. No.: 12/517,381

(22) PCT Filed: Feb. 27, 2008

(86) PCT No.: PCT/JP2008/000373
§ 371 (c)(1),
(2), (4) Date: Jun. 3, 2009

(87) PCT Pub. No.: WO2008/105179
PCT Pub. Date: Sep. 4, 2008

(65) Prior Publication Data
US 2010/0013841 A1 Jan. 21, 2010

(30) Foreign Application Priority Data
Feb. 28, 2007 (JP) .................... 2007-050443

(51) Int. Cl.
*H04N 5/63* (2006.01)
(52) U.S. Cl. ........................................................ 348/730
(58) Field of Classification Search .................. 348/730, 348/552, 553, 569, 554, 739; 725/38, 59, 725/131, 139, 151; 386/83; 345/707
See application file for complete search history.

(56) References Cited

U.S. PATENT DOCUMENTS
| | | | |
|---|---|---|---|
| 6,888,576 B2* | 5/2005 | Takagi et al. ................. | 348/569 |
| 7,420,621 B2* | 9/2008 | Tsukamoto et al. .......... | 348/569 |
| 2002/0113896 A1* | 8/2002 | Takagi et al. ................. | 348/569 |
| 2005/0237436 A1* | 10/2005 | Teramoto ...................... | 348/734 |
| 2005/0275757 A1* | 12/2005 | Tsukamoto et al. .......... | 348/705 |
| 2007/0222773 A1 | 9/2007 | Konno et al. | |
| 2007/0285364 A1* | 12/2007 | Nakagawa et al. ............ | 345/87 |

FOREIGN PATENT DOCUMENTS
| | | |
|---|---|---|
| JP | 2000-234770 A | 10/2000 |
| JP | 2000-284770 | 10/2000 |
| JP | 2000-284770 A | 10/2000 |
| JP | 2002-049381 A | 2/2002 |
| JP | 2002-247464 A | 8/2002 |
| JP | 2003-046900 A | 2/2003 |
| JP | 2003-319163 A | 11/2003 |

(Continued)

OTHER PUBLICATIONS

JP Office Action in 2009-501139, dated Nov. 1, 2011.
English language Abstract of JP 2006-238255 A (Sep. 7, 2006).
English language Abstract of JP 2000-284770 A (Oct. 13, 2000).
English language Abstract of JP 2002-049381 A (Feb. 15, 2002).
English language Abstract of JP 2004-333079 A (Nov. 25, 2004).
English language Abstract of JP 2006-157183 A (Jun. 15, 2006).
English language Abstract of JP 2003-046900 A (Feb. 14, 2003).
English language Abstract of JP 2005-102062 A (Apr. 14, 2005).

(Continued)

*Primary Examiner* — Paulos M Natnael
(74) *Attorney, Agent, or Firm* — Greenblum & Bernstein. P.L.C.

(57) ABSTRACT

When an operation mode of a television receiver is a normal mode, insertion of a memory card having trigger information stored therein into a card insertion portion causes a storefront mode setting screen to be displayed on a video display unit. When the operation mode of the television receiver is a storefront mode, detection of supply of power by a power supply detector causes a storefront mode release screen to be displayed on the video display unit. Users performs selection and setting on the storefront mode setting screen and the storefront mode release confirmation screen by operating a remote controller to switch the operation mode of the television receiver.

12 Claims, 8 Drawing Sheets

FOREIGN PATENT DOCUMENTS

| | | |
|---|---|---|
| JP | 2004-333079 A | 11/2004 |
| JP | 2005-028866 A | 2/2005 |
| JP | 2005-102062 A | 4/2005 |
| JP | 2005-295436 A | 10/2005 |
| JP | 2006-148705 A | 6/2006 |
| JP | 2006-157183 A | 6/2006 |
| JP | 2006-238255 | 9/2006 |
| JP | 2006-238255 A | 9/2006 |

OTHER PUBLICATIONS

English language Abstract of JP 2003-319163 A (Nov. 7, 2003).
English language Abstract of JP 2006-148705 A (Jun. 8, 2006).
English language Abstract of JP 2005-028866 A (Feb. 3, 2005).
China Office action, mail date is Jan. 6, 2011.
Search report from E.P.O., mail date is Jan. 17, 2011.

* cited by examiner

DISPLAY DEVICE AND ITS CONTROL METHOD

TECHNICAL FIELD

The present invention relates to a display device that displays video on a screen and a method of controlling the same.

BACKGROUND ART

Normally, in display devices such as a television receiver, display states such as the contrast of a screen can be adjusted by users as desired.

Meanwhile, in retail stores and so on, the display state of the screen of the display device is preferably set in a given state in order to present the full extent of characteristics and appeal of the product to customers.

Therefore, a display device capable of switching between an operation mode set for household use (hereinafter referred to as a normal mode) and an operation mode set for use in retail stores and so on (hereinafter referred to as a storefront mode) has been proposed (see Patent Document 1, for example).

In the normal mode, when the display state of the screen of the display device is changed by users, the changed state is maintained.

On the other hand, in the storefront mode, the display mode of the screen is returned to the given state that is appropriate for storefront display whenever a predetermined time period elapses.

In this case, the display state of the screen is automatically returned to the appropriate given state after the elapse of the predetermined time period even if the display state of the screen of the display device on exhibit is changed to an undesirable state by customers.
[Patent Document 1] JP 2006-238255 A

DISCLOSURE OF THE INVENTION

Problems to be Solved by the Invention

In a conventional display device, however, switching between the normal mode and the storefront mode requires complicated operations. For example, specific keys of a remote controller need to be pressed in a specific order to switch the operation mode. Therefore, it is very complicated to switch the operation mode in retail stores.

In addition, when a display device that has been on storefront display is purchased by a customer, the display device set in the storefront mode by mistake is delivered to the customer in some cases. Usually, explanation on how to switch from the storefront mode to the normal mode is not made to customers. Customers do not even know the presence of the storefront mode in many cases.

Therefore, the customers use the purchased display device set in the storefront mode. In this case, the display state of the screen is returned to the given state whenever the predetermined time period elapses even if the customers adjust the display state of the screen according to their preference or use environment. This makes the customers distrustful of the retail store or the product.

An object of the present invention is to provide a display device capable of switching from the normal operation mode to the given operation mode with simple operation and a method of controlling the same.

Another object of the present invention is to provide a display device capable of easily and reliably switching from the given operation mode to the normal operation mode and a method of controlling the same.

Still another object of the present invention is to provide a display device in which either the given operation mode or the normal operation mode can easily and reliably be set and a method of controlling the same.

Means for Solving the Problems (1) According to an aspect of the present invention, a display device includes an output unit outputting at least video, an operation unit operated by a user for adjusting an output condition of the output unit, a controller selectively controlling the output unit to be placed in a first mode where, when the output condition of the output unit is adjusted by operation of the operation unit, the output condition of the output unit is maintained in an adjusted state, or a second mode where, when the output condition of the output unit is adjusted by operation of the operation unit, the output condition of the output unit is shifted to a predetermined state after an elapse of a predetermined time period, and a storage medium attachment portion to which a storage medium having information stored therein is attached in a removable manner, wherein the controller, in a case where the output unit is set in the first mode, causes the output unit to output a selection picture that encourages the user to select either the first or second mode at the time of attachment of the storage medium having the information for selecting between the first and second modes stored therein to the storage medium attachment portion, and subsequently sets the output unit in the second mode when the second mode is selected by the user.

In the display device, the output unit outputting at least video is selectively controlled by the controller to be placed in the first mode or the second mode. In the first mode, when the user operates the operation unit to adjust the output condition of the output unit, the output condition of the output unit is maintained in the adjusted state. In the second mode, when the user operates the operation unit to adjust the output condition of the output unit, the output condition of the output unit is shifted to the predetermined state after an elapse of the predetermined time period.

In general homes, for example, the output unit is set in the first mode, so that the output condition of the output unit is adjusted according to users' preference and use environments to be maintained. Meanwhile, in retail stores, for example, the output unit is set in the second mode, so that the output condition of the output unit is shifted to the predetermined appropriate state after an elapse of the predetermined time period even if the output condition of the output unit is adjusted by, for example, customers. In this case, characteristics and appeal of the product can sufficiently be presented to the customers.

In retail stores, attaching the storage medium having the information for selecting between the first and second modes stored therein to the storage medium attachment portion while the output unit is set in the first mode causes the selection picture that encourages a user who is a salesclerk, for example to select either the first or second mode to be output by the output unit. When the user who is a salesclerk selects the second mode in the selection picture, the output unit is set in the second mode by the controller.

In this manner, the output unit can be switched from the first mode to the second mode with simple operation. This significantly reduces time and work for setting the output unit in the second mode in retail stores.

(2) The storage medium may include a memory card. In this case, the storage medium is reduced in size to be easily handled.

(3) According to another aspect of the present invention, a display device includes an output unit outputting at least video, an operation unit operated by a user for adjusting an output condition of the output unit, a controller selectively controlling the output unit to be placed in a first mode where, when the output condition of the output unit is adjusted by operation of the operation unit, the output condition of the output unit is maintained in an adjusted state, and a second mode where, when the output condition of the output unit is adjusted by operation of the operation unit, the output condition of the output unit is shifted to a predetermined state after an elapse of a predetermined time period, and a power supply detector detecting supply of power, wherein the controller, in a case where the output unit is set in the second mode, causes the output unit to output a selection picture that encourages the user to select either the first or second mode at the time of detection of the supply of power by the power supply detector, and subsequently sets the output unit in the first mode when the first mode is selected by the user.

In the display device, the output unit outputting at least video is selectively controlled by the controller to be placed in the first mode or the second mode. In the first mode, when the user operates the operation unit to adjust the output condition of the output unit, the output condition of the output unit is maintained in the adjusted state. In the second mode, when the user operates the operation unit to adjust the output condition of the output unit, the output condition of the output unit is shifted to the predetermined state after an elapse of the predetermined time period.

In general homes, the output unit is set in the first mode, so that the output condition of the output unit is adjusted according to users' preference and use environments to be maintained. Meanwhile, in retail stores, the output unit is set in the second mode, so that the output condition of the output unit is shifted to the predetermined appropriate state after an elapse of the predetermined time period even if the output condition of the output unit is adjusted by customers. In this case, characteristics and appeal of the product can sufficiently be presented to the customers.

In general homes, when the supply of power to the display device is detected by the power supply detector while the output unit is set in the second mode, the selection picture that encourages the user to select either the first or second mode is output by the output unit. When the user selects the first mode in the selection picture, the output unit is set in the first mode by the controller.

In this case, the output unit can easily and reliably be switched from the second mode to the first mode when the user who is a customer, for example, first inserts a power supply plug in a power supply outlet even if the display device whose output unit is set in the second mode by mistake is delivered to the customer.

(4) The controller may cause output of the selection picture to finish and set the output unit in the second mode when selection is not performed by the user within a predetermined time period after the selection picture is output by the output unit.

In this case, even if selection pictures are output when supply of power to display devices are started at all once by a salesclerk operating a breaker in a retail store, for example, both the first and second modes are left unselected to maintain the second mode. This reduces workload of the salesclerk in the retail store, for example.

(5) According to still another aspect of the present invention, a display device includes an output unit outputting at least video, an operation unit operated by a user for adjusting an output condition of the output unit, a controller selectively controlling the output unit to be placed in a first mode where, when the output condition of the output unit is adjusted by operation of the operation unit, the output condition of the output unit is maintained in an adjusted state, a second mode where, when the output condition of the output unit is adjusted by operation of the operation unit, the output condition of the output unit is shifted to a predetermined state after an elapse of a predetermined time period, and a third mode for encouraging the user to select either the first or second mode, and a power supply detector detecting supply of power, wherein the controller, in a case where the output unit is set in the third mode, causes the output unit to output a selection picture that encourages the user to select either the first or second mode at the time of detection of the supply of power by the power supply detector, and subsequently sets the output unit in either the first or second mode based on selection by the user.

In the display device, the output unit outputting at least video is selectively controlled by the controller to be placed in any of the first to third modes.

When the supply of power is detected by the power supply detector while the output unit is set in the third mode, the selection picture that encourages the user to select either the first or second mode is output by the output unit. In the selection picture, the user selects either the first or second mode. Thus, the output unit is set in the first or second mode by the controller.

In this case, the output unit is set in the third mode at the time of shipment from a factory, for example, so that the selection picture is output when power is first supplied in general homes, retail stores and so on. Therefore, either the first or second mode can easily and reliably be selected and set by a user depending on uses.

In the first mode, when the user operates the operation unit to adjust the output condition of the output unit, the output condition of the output unit is maintained in the adjusted state. In the second mode, when the user operates the operation unit to adjust the output condition of the output unit, the output condition of the output unit is shifted to the predetermined state after an elapse of the predetermined time period.

In general homes, the output unit is set in the first mode, so that the output condition of the output unit is adjusted according to users' preference and use environments to be maintained. On the other hand, in retail stores, the output unit is set in the second mode, so that the output condition of the output unit is shifted to the predetermined appropriate state after an elapse of the predetermined time period even if the output condition of the output unit is adjusted by customers. In this case, characteristics and appeal of the product can sufficiently be presented to the customers.

(6) The controller may cause the output unit to continuously output the selection picture until either the first or second mode is selected by the user.

In this case, the output unit is not automatically set in the first or second mode according to an elapse of time or other causes, but reliably set in the first or second mode by selection of the user. This significantly lowers the possibility of setting the output unit in an erroneous mode.

(7) The output unit may include a video display unit displaying video, and the output condition of the output unit may include a state related to a screen of the video display unit and a state related to display of video.

In this case, in the first mode, when the user operates the operation unit to adjust the state related to the screen of the video display unit or the state related to display of video, those states are maintained being adjusted. In the second mode, when the user operates the operation unit to adjust the state related to the screen of the video display unit or the state related to display of video, those states are shifted to predetermined states after an elapse of the predetermined time period.

(8) The output unit may include an audio output unit outputting sound, and the output condition of the output unit may include a state of output of sound by the audio output unit.

In this case, in the first mode, when the user operates the operation unit to adjust the state of output of sound by the audio output unit, the state of output of sound by the audio output unit is maintained being adjusted. In the second mode, when the user operates the operation unit to adjust the state of output of sound by the audio output unit, the state of output of sound by the audio output unit is shifted to the predetermined state after an elapse of the predetermined time period.

(9) According to still another aspect of the present invention, a method of controlling a display device having a first mode where, when an output condition of an output unit is adjusted, the output condition is maintained in an adjusted state, and a second mode where, when the output condition of the output unit is adjusted, the output condition is shifted to a predetermined state after an elapse of a predetermined time period, includes the steps of causing, when the output unit is set in the first mode, the output unit to output a selection picture that encourages a user to select either the first or second mode at the time of attachment of a storage medium having information for selecting between the first and second modes stored therein to a storage medium attachment portion, and setting the output unit in the second mode when the second mode is selected by the user.

In the method of controlling the display device, in retail stores, when the storage medium having the information for selecting between the first and second modes stored therein is attached to the storage medium attachment portion while the output unit is set in the first mode, the selection picture that encourages the user who is a salesclerk to select either the first or second mode is output by the output unit. When the user who is a salesclerk selects the second mode in the selection picture, the output unit is set in the second mode.

In this manner, the output unit can be switched from the first mode to the second mode with simple operation. This significantly reduces time and work for setting the output unit in the second mode in retail stores.

(10) According to still another aspect of the present invention, a method of controlling a display device having a first mode where, when an output condition of an output unit is adjusted, the output condition is maintained in an adjusted state, and a second mode where, when the output condition of the output unit is adjusted, the output condition is shifted to a predetermined state after an elapse of a predetermined time period, includes the steps of causing, when the output unit is set in the second mode, the output unit to output a selection picture that encourages a user to select either the first or second mode at the time of detection of supply of power, and setting the output unit in the first mode when the first mode is selected by the user.

In the method of controlling the display device, in general homes, when the supply of power to the display device is detected while the output unit is set in the second mode, the selection picture that encourages the user to select either the first or second mode is output by the output unit. When the user selects the first mode in the selection picture, the output unit is set in the first mode.

In this case, the output unit can easily and reliably be switched from the second mode to the first mode when the user who is a customer first inserts a power supply plug in a power supply outlet even if the display device whose output unit is set in the second mode by mistake is delivered to the customer.

(11) According to still another aspect of the present invention, a method of controlling a display device having a first mode where, when an output condition of an output unit is adjusted, the output condition is maintained in an adjusted state, a second mode where, when the output condition of the output unit is adjusted, the output condition is shifted to a predetermined state after an elapse of a predetermined time period, and a third mode for encouraging a user to select either the first or second mode, includes the steps of causing, when the output unit is set in the third mode, the output unit to output a selection picture that encourages the user to select either the first or second mode at the time of detection of supply of power, and setting the output unit in either the first or second mode based on selection by the user.

In the method of controlling the display device, when the supply of power to the display device is detected while the output unit is set in the third mode, the selection picture that encourages the user to select either the first or second mode is output by the output unit. In the selection picture, the user selects either the first or second mode. Thus, the output unit is set in the first or second mode.

In this case, the output unit is set in the third mode at the time of shipment from a factory, for example, so that the selection picture is output when power is first supplied in general homes, retail stores and so on. Therefore, the first or second mode can easily and reliably be selected and set by the user depending on uses.

Effects of the Invention

According to the present invention, the output unit can be switched from the first mode to the second mode with simple operation. This significantly reduces time and work for setting the output unit in the second mode in retail stores.

In addition, the output unit can easily and reliably be switched from the second mode to the first mode when a power supply plug is first inserted in a power supply outlet by the user who is a customer even if the display device whose output unit is set in the second mode by mistake is delivered to the customer.

Moreover, the user can easily and reliably select and set either the first or second mode depending on uses when power is first supplied in general homes, retail stores and so on.

BEST MODE FOR CARRYING OUT THE INVENTION

Description will be made of a television receiver as one example of a display device according to embodiments of the present invention with reference to the drawings.

(1) First Embodiment (1-1) Configuration of Television Receiver

Figure 1:
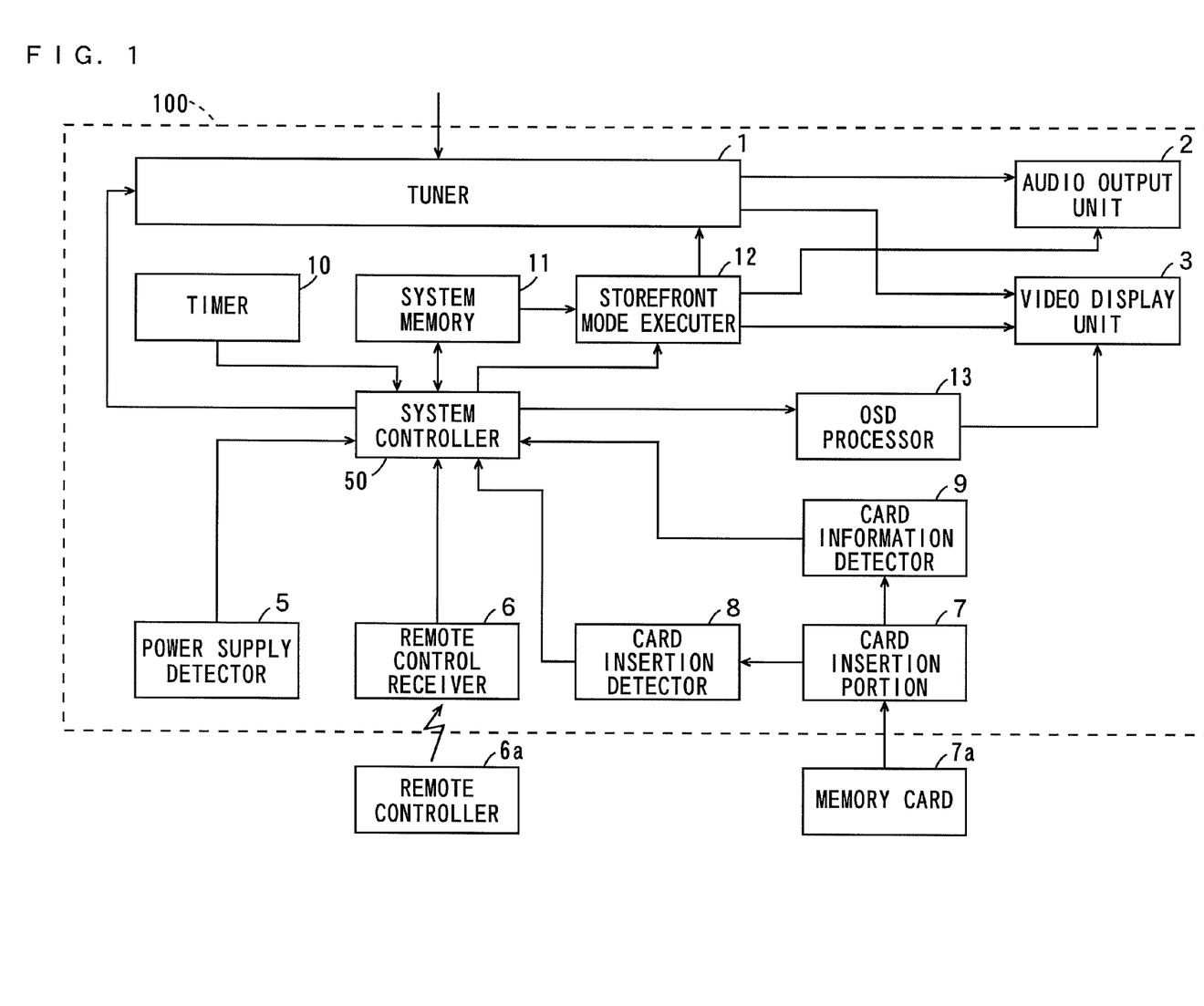
FIG. 1 is a block diagram showing the configuration of a television receiver according to the present embodiment.

FIG. 1 is a block diagram showing the configuration of a television receiver according to the present embodiment. As shown in FIG. 1, the television receiver 100 includes a tuner 1, an audio output unit 2, a video display unit 3, a power supply detector 5, a remote control receiver 6, a card insertion portion 7, a card insertion detector 8, a card information detector 9, a timer 10, a system memory 11, a storefront mode executer 12, an OSD processor 13 and a system controller 50.

The tuner 1 selects a channel by selecting a frequency of a television broadcasting signal (a digital broadcasting signal, for example) transmitted from a broadcast station based on control by the system controller 50, described later. The tuner 1 demodulates and decodes a video signal and an audio signal from the selected television broadcasting signal to output the signals.

The audio output unit 2 includes an audio speaker or the like, and outputs sound based on the audio signal output from the tuner 1. The video display unit 3 includes a display panel such as a liquid crystal display panel or a plasma display panel, and outputs video on a screen based on the video signal output from the tuner 1.

The power supply detector 5 detects supply of power from an AC power source, and outputs a detection result as a detection signal. For example, a power supply plug, not shown, is inserted in an outlet of the AC power supply, so that power is supplied to the television receiver 100. The remote control receiver 6 receives an infrared signal from a remote controller 6a, and outputs an operation signal based on the infrared signal.

A memory card 7a such as an SD (Secure Digital Memory) card is inserted into the card insertion portion 7. Information functioning as a trigger of storefront mode setting processing, described later, (hereinafter referred to as trigger information) is stored in the memory card 7a used in the present embodiment.

The card insertion detector 8 detects whether or not the memory card 7a is inserted into the card insertion portion 7, and outputs a detection result as a detection signal. The card information detector 9 detects the information stored in the memory card 7a inserted into the card insertion portion 7, and outputs a detection result as a detection signal.

The timer 10 operates according to control by the system controller 50, and measures an elapsed time period from a predetermined time point. The system memory 11 has various types of information related to operation modes of the television receiver 100 (hereinafter referred to as operation mode information) stored therein. The operation modes of the television receiver 100 include a storefront mode and a normal mode, as described later.

The storefront mode executer 12 performs predetermined processing to the tuner 1, the audio output unit 2 and the video display unit 3 based on a value measured by the timer 10 and the operation mode information stored in the system memory 11 when the operation mode of the television receiver 100 is the storefront mode. Details will be described later.

The OSD processor 13 performs an on-screen display (OSD) on the screen of the video display unit 3 according to control by the system controller 50.

The system controller 50 is composed of a CPU (Central Processing Unit), a memory and so on, and controls each of the functional units of the television receiver 100. In the present embodiment, when the memory card 7a having the trigger information stored therein is inserted into the card insertion portion 7, the system controller 50 performs the storefront mode setting processing, described later. In this case, the system controller 50 controls the storefront mode executer 12 and the OSD processor 13 based on the detection signal from the card insertion detector 8, the detection signal from the card information detector 9 and the operation signal from the remote control receiver 6.

When the power supply detector 5 detects supply of power to the television receiver 100, the system controller 50 performs storefront mode release processing, described later. In this case, the system controller 50 controls the storefront mode executer 12 and the OSD processor 13 based on the detection signal from the power supply detector 5, the operation signal from the remote control receiver 6 and a value measured by the time 10.

(1-2) Operation Modes of the Television Receiver

Here, the operation modes of the television receiver 100 will be described. As described above, the operation modes of the television receiver 100 includes the storefront mode and the normal mode.

In the normal mode, a display state of the video display unit 3 and an output state of the audio output unit 2 set by a user using the remote controller 6a are maintained. Here, the display state of the video display unit 3 includes a state related to the screen such as a contrast, luminance and definition of the screen as well as a state related to video display such as a channel of video to be displayed on the screen and types of received signals. The output state of the audio output unit 2 includes a state related to audio output such as sound volume, sound quality and a mute state (silent state). Hereinafter, the display state of the video display unit 3 and the output state of the audio output unit 2 will be referred to as an output condition.

In the storefront mode, the output condition is set to a given state appropriate for storefront display of the television receiver 100. When the output condition is adjusted by a user, the output condition is returned to the given state after an elapse of a prescribed time period (5 minutes, for example).

Note that the foregoing prescribed time period (hereinafter referred to as a return interval) and the foregoing given state of the output condition (hereinafter referred to as a return state) are stored in the system memory 11 as operation mode information. The current operation mode of the television receiver 100 is also stored in the system memory 1 as operation mode information.

Hereinafter, description will be made of a method of switching from the normal mode to the storefront mode and a method of switching from the storefront mode to the normal mode.

(1-3) Switching from the Normal Mode to the Storefront Mode

When the operation mode of the television receiver 100 is the normal mode, insertion of the memory card 7a having the trigger information stored therein into the card insertion portion 7 causes a storefront mode setting screen to be displayed on the video display unit 3. A user performs selection and setting on the storefront mode setting screen by operating the remote controller 6*a*.

Figure 2:
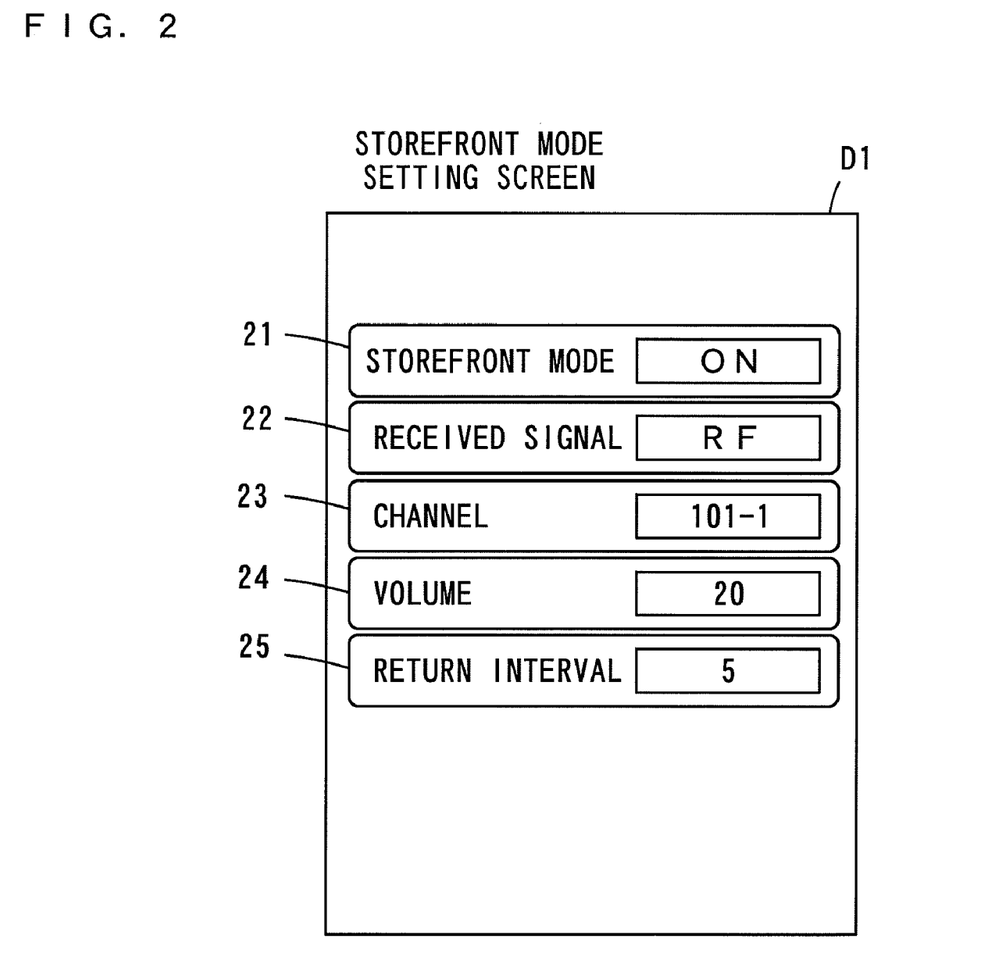
FIG. 2 is a diagram showing one example of a storefront mode setting screen.

FIG. 2 is a diagram showing one example of the storefront mode setting screen. As shown in FIG. 2, the storefront mode setting screen D1 is composed of an ON/OFF selection portion 21, a received signal setting portion 22, a channel setting portion 23, a sound volume setting portion 24 and a return interval setting portion 25.

The user selects whether or not to set the operation mode of the television receiver 100 to the storefront mode in the ON/OFF selection portion 21. In the ON/OFF selection portion 21, when "ON" is selected, the operation mode of the television receiver 100 is switched from the normal mode to the storefront mode, and when OFF is selected, the operation mode is maintained in the normal mode.

The user sets the type of the received signal in the received signal setting portion 22, sets the channel in the channel setting portion 23, and sets the sound volume in the sound volume setting portion 24 as the return state of the output condition. In addition, the user sets the return interval in the return interval setting portion 25. After the settings, the user causes display of the storefront mode display screen D1 to finish by pressing an Exit key or a Return key of the remote controller 6*a*, for example. Note that display of the storefront mode setting screen D1 is also finished when a channel selection is performed, input switching is performed or another OSD screen such as a menu is displayed by operation of the remote controller 6*a*, for example.

In the example of FIG. 2, the type of the received signal is set to an RF signal, the channel to 101-1, the sound volume to 20, and the return interval to 5 minutes.

While the type of the receive signal, the channel and the sound volume are set in the storefront mode setting screen D1 in the example of FIG. 2, another return state such as the contrast of the screen may be set in the storefront mode setting screen D1.

Figure 3:
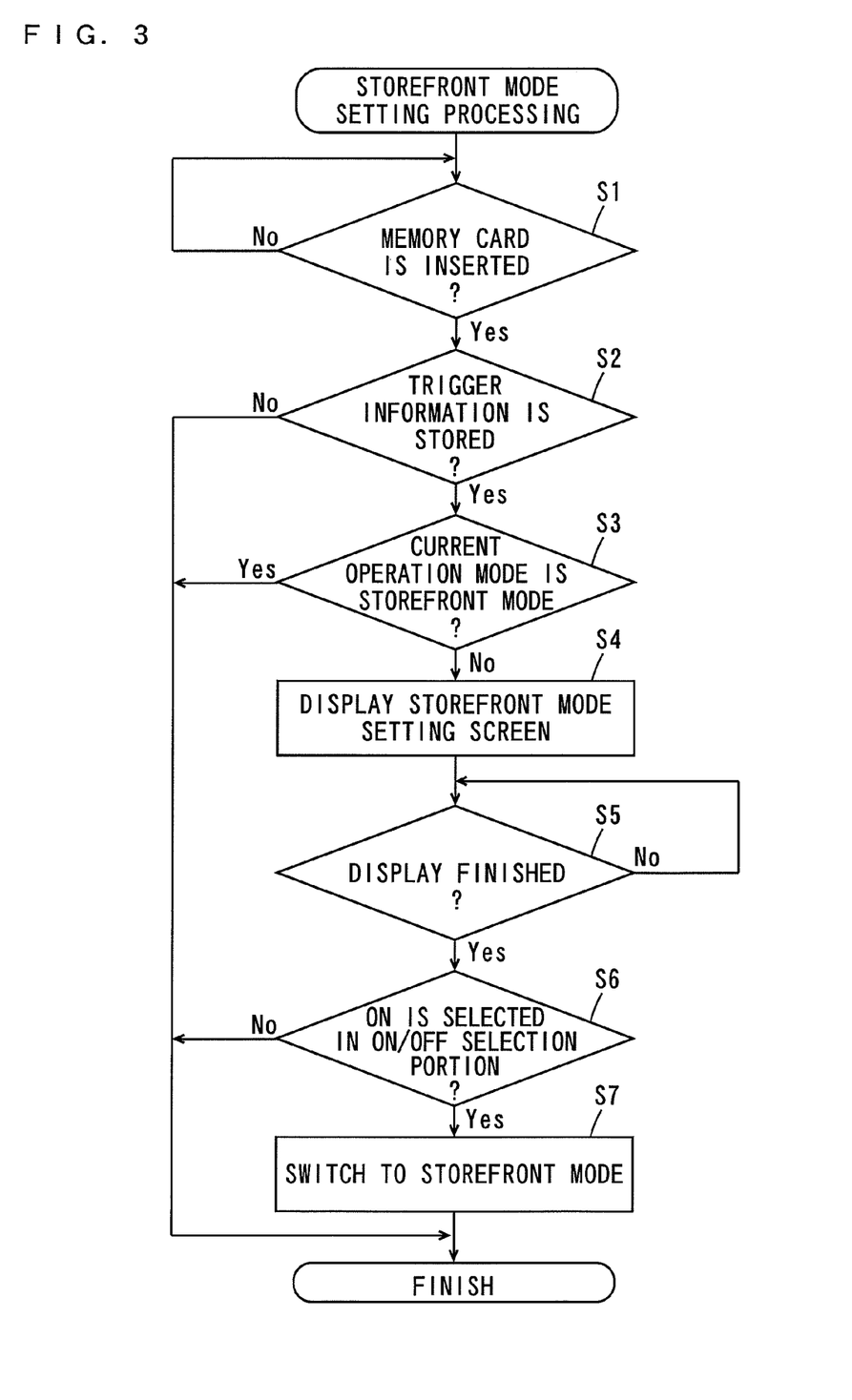
FIG. 3 is a flowchart showing storefront mode setting processing by a system controller.

FIG. 3 is a flowchart showing the storefront mode setting processing by the system controller 50. As shown in FIG. 3, first, the system controller 50 determines whether or not the memory card 7*a* is inserted into the card insertion portion 7 based on the detection signal from the card insertion detector 8 (Step S1). When the memory card 7*a* is not inserted into the card insertion portion 7, the system controller 50 repeats the process of Step S1.

When the memory card 7*a* is inserted into the card insertion portion 7, the system controller 50 determines whether or not the trigger information is stored in the inserted memory card 7*a* based on the detection signal from the card information detector 9 (Step S2).

When the trigger information is not stored in the memory card 7*a*, the system controller 50 finishes the storefront mode setting processing. When the trigger information is stored in the memory card 7*a*, the system controller 50 determines whether or not the current operation mode is the storefront mode based on the operation mode information stored in the system memory 11 (Step S3).

When the current operation mode is the storefront mode, the system controller 50 maintains the operation mode in the storefront mode and finishes the storefront mode setting processing. When the current operation mode is the normal mode, the system controller 50 causes the storefront mode setting screen D1 of FIG. 2 to be displayed on the video display unit 3 by controlling the OSD processor 13 (Step S4).

Then, the system controller 50 determines whether or not operation for finishing the display of the storefront mode setting screen D1 has been performed (Step S5). The operation for finishing the display of the storefront mode setting screen D1 indicates, for example, the above-described operations such as pressing the Exit key or the Return key of the remote controller 6*a*, the channel selection, the input switching or display of another OSD screen such as a menu. When the operation for finishing the display of the storefront mode setting screen D1 is not performed, the system controller 50 repeats the process of Step S5.

When the operation for finishing the display of the storefront mode setting screen D1 is performed, the system controller 50 determines whether or not ON is selected in the ON/OFF selection portion 21 of the storefront mode setting screen D1 (Step S6). When ON is not selected in the ON/OFF selection portion 21, in other words, when OFF is selected, the system controller 50 maintains the operation mode in the normal mode and finishes the storefront mode setting processing. When ON is selected in the ON/OFF selection portion 21, the system controller 50 switches the operation mode to the storefront mode (Step S7). That is, the system controller 50 updates the current operation mode stored in the system memory II to the storefront mode and stores in the system memory 11 the type of the received signal, the channel, the sound volume and the return interval set in the storefront mode setting screen D1. Then, the system controller 50 finishes the storefront mode setting processing.

(1-4) Switching from the Storefront Mode to the Normal Mode

When the operation mode of the television receiver 100 is the storefront mode, detection of supply of power to the television receiver 100 by the power supply detector 5 causes a storefront mode release confirmation screen to be displayed on the video display unit 3. The user performs selection and setting on the storefront mode release confirmation screen by operating the remote controller 6*a*.

Figure 4:
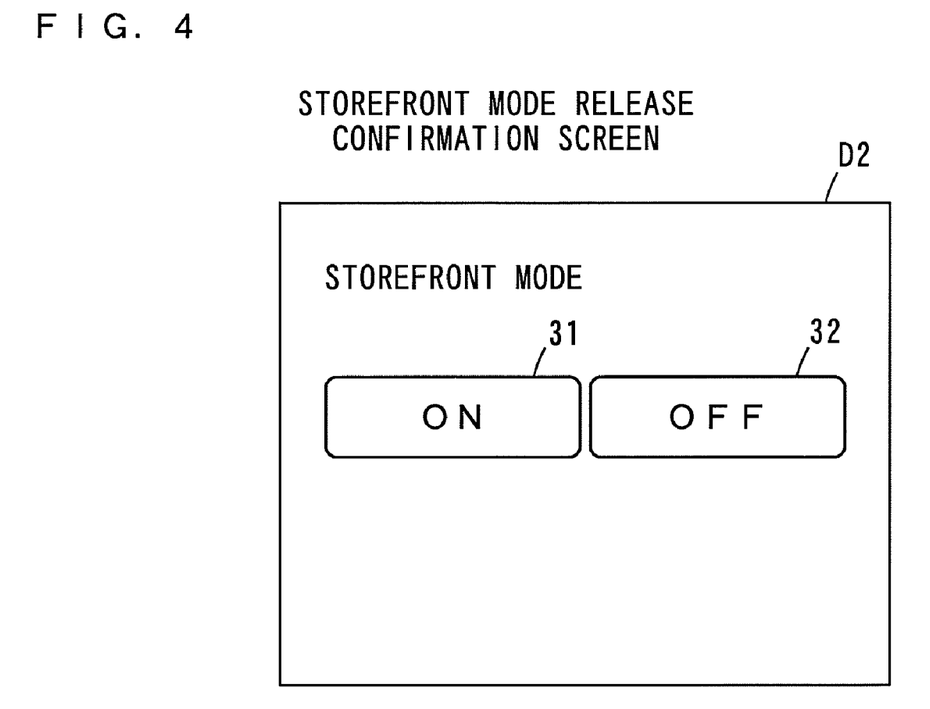
FIG. 4 is a diagram showing one example of a storefront mode release confirmation screen.

FIG. 4 is a diagram showing one example of the storefront mode release confirmation screen. As shown in FIG. 4, the storefront mode release confirmation screen D2 includes an ON button 31 and an OFF button 32. In the storefront mode release confirmation screen D2, when the user selects the ON button 31, the operation mode is maintained in the storefront mode, and when the user selects the OFF button 32, the operation mode is switched to the normal mode. Note that selection of the ON button 31 or the OFF button 32 is confirmed by the user pressing the OK key of the remote controller 6*a*, for example.

Note that when both the ON button 31 and the OFF button 32 are left unselected by the user, the storefront mode release confirmation screen D2 is automatically closed. In this case, the operation mode is maintained in the storefront mode.

Figure 5:
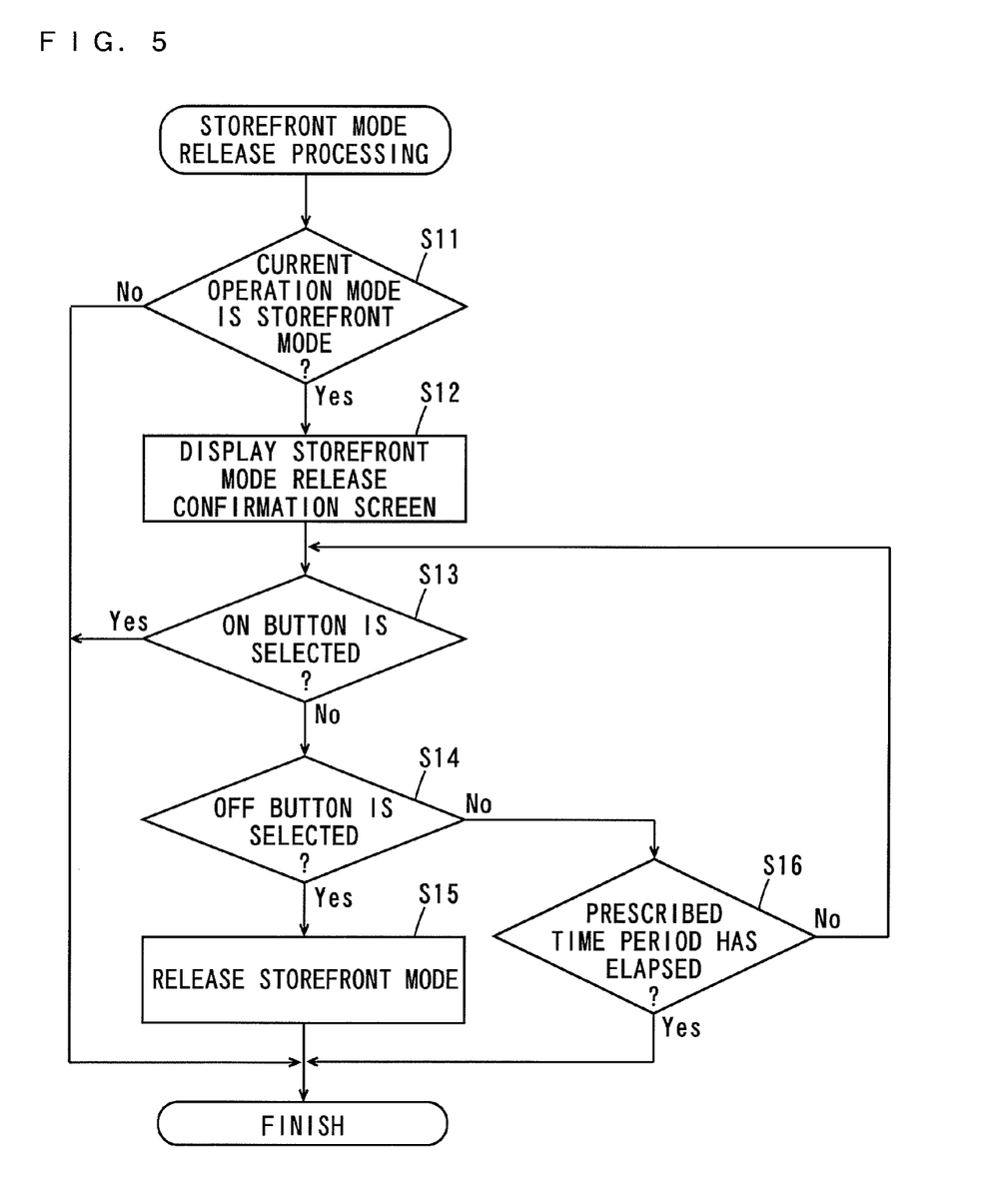
FIG. 5 is a flowchart showing storefront mode release processing by the system controller.

FIG. 5 is a flowchart showing the storefront mode release processing by the system controller 50. The storefront mode release processing shown in FIG. 5 is started when the power supply detector 5 detects supply of power to the television receiver 100.

When the power supply detector 5 detects supply of power to the television receiver 100, the system controller 50 determines whether or not the current operation mode is the storefront mode based on the operation mode information stored in the system memory 11 (Step S11). When the current operation mode is not the storefront mode, the system controller 50 maintains the operation mode in the normal mode and finishes the storefront mode release processing. When the current operation mode is the storefront mode, the system controller 50 causes the storefront mode release confirmation screen D2 of FIG. 4 to be displayed on the video display unit 3 by controlling the OSD processor 13 (Step S12).

Then, the system controller 50 determines whether or not the OK key of the remote controller 6a has been pressed with the ON button 31 selected in the storefront mode release confirmation screen D2 (Step S13). When the OK key of the remote controller 6a is pressed with the ON button 31 selected, the system controller 50 maintains the operation mode in the storefront mode and finishes the storefront mode release processing. When the OK key of the remote controller 6a is not pressed with the ON button 31 selected, the system controller 50 determines whether or not the OK key of the remote controller 6a has been pressed with the OFF button 32 selected (Step S14). When the OK key of the remote controller 6a is pressed with the OFF button 32 selected, the system controller 50 switches the operation mode to the normal mode (Step S15). That is, the system controller 50 updates the current operation mode stored in the system memory 11 to the normal mode. Then, the system controller 50 finishes the storefront mode release processing.

When the OK key of the remote controller 6a is not pressed, the system controller 50 determines based on a value measured by the timer 10 whether or not the prescribed time period (30 seconds, for example) has elapsed since the storefront mode release confirmation screen D2 was displayed (Step S16). Note that the prescribed time period is stored in the system memory 11, for example, in advance.

When the prescribed time period has not elapsed, the system controller 50 returns to the process of Step S13. When the prescribed time period has elapsed, the system controller 50 causes the storefront mode release confirmation screen D2 to be closed while maintaining the operation mode to the storefront mode, and finishes the storefront mode release processing.

(1-5) Effects of the Embodiment

In the present embodiment, the memory card 7a is inserted into the card insertion portion 7 and ON is selected in the ON/OFF selection portion 21 of the storefront mode setting screen D1 displayed on the video output unit 3, so that the operation mode of the television receiver 100 can be switched from the normal mode to the storefront mode. In this case, the operation mode of the television receiver 100 can be switched to the storefront mode with simple operation, and thus time and work for switching to the storefront mode can significantly be reduced in retail stores and so on.

In addition, when the current operation mode of the television receiver 100 is the storefront mode at the time of detection of supply of power to the television receiver 100, the storefront mode release confirmation screen D2 for confirming whether or not to switch to the normal mode is displayed on the video output unit 3 in the present embodiment. Therefore, the storefront mode release confirmation screen D2 is displayed on the video output unit 3 when a customer first inserts the power supply plug in an outlet of the AC power supply even if the television receiver 100 set in the storefront mode by mistake is delivered to the customer. Accordingly, the operation mode of the television receiver 100 can easily and reliably be switched from the storefront mode to the normal mode by the customer. This prevents the television receiver 100 from being used by the customer not knowing that the operation mode is set to the storefront mode.

Moreover, when the storefront mode release confirmation screen D2 is displayed and the user does not select whether or not to switch the operation mode to the normal mode in the prescribed time period, the storefront mode release confirmation screen D2 is closed while the operation mode is maintained in the storefront mode. Therefore, in order to cause the operation mode of the television receiver 100 to be continuously set to the storefront mode in retail stores and so on, the storefront mode release confirmation screen D2, which is displayed by detection of supply of power, is left unoperated, so that the storefront mode is maintained. This reduces workloads of salesclerks in retail stores and so on.

Furthermore, supply of power to the television receiver 100 has to at least temporarily be stopped in order to switch the operation mode from the storefront mode to the normal mode. Therefore, the operation mode can be prevented from being switched from the storefront mode to the normal mode without permission for the purpose of, for example, interference with sales in retail stores and so on.

(2) Second Embodiment

Next, a second embodiment of the present invention will be described by referring to differences from the foregoing first embodiment. In the present embodiment, the television receiver 100 is set in a shipment mode when shipped from a factory. Then, operation mode selection processing, described later, is performed by the system controller 50 at the time of the first supply of power to the television receiver 100 in retail stores, general homes, and so on. When the television receiver 100 is in the shipment mode or the operation mode at the time of supply of power, a mode selection screen is displayed on the video display unit 3. The user selects the operation mode of the television receiver 100 on the mode selection screen by operating the remote controller 6a and so on.

Figure 6:
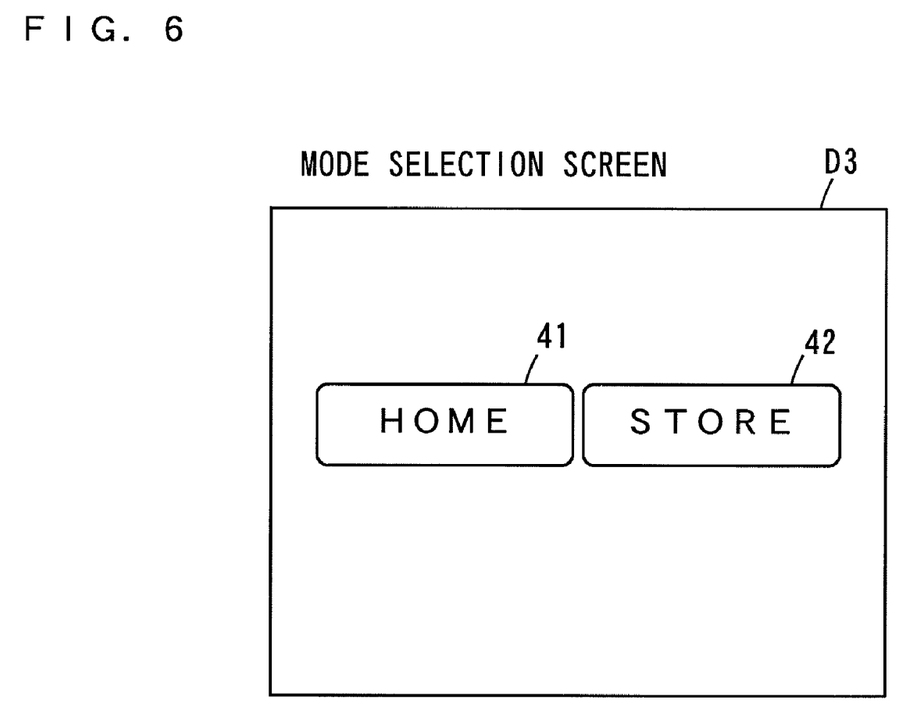
FIG. 6 is a diagram showing one example of a mode selection screen.

FIG. 6 is a diagram showing one example of the mode selection screen. As shown in FIG. 6, the mode selection screen D3 includes a "HOME" button 41 and a "STORE" button 42. The user selects either the "HOME" button 41 or the "STORE" button 42 on the mode selection screen D3. This causes the operation mode of the television receiver 100 to be selected to the normal mode or the storefront mode.

Figure 7:
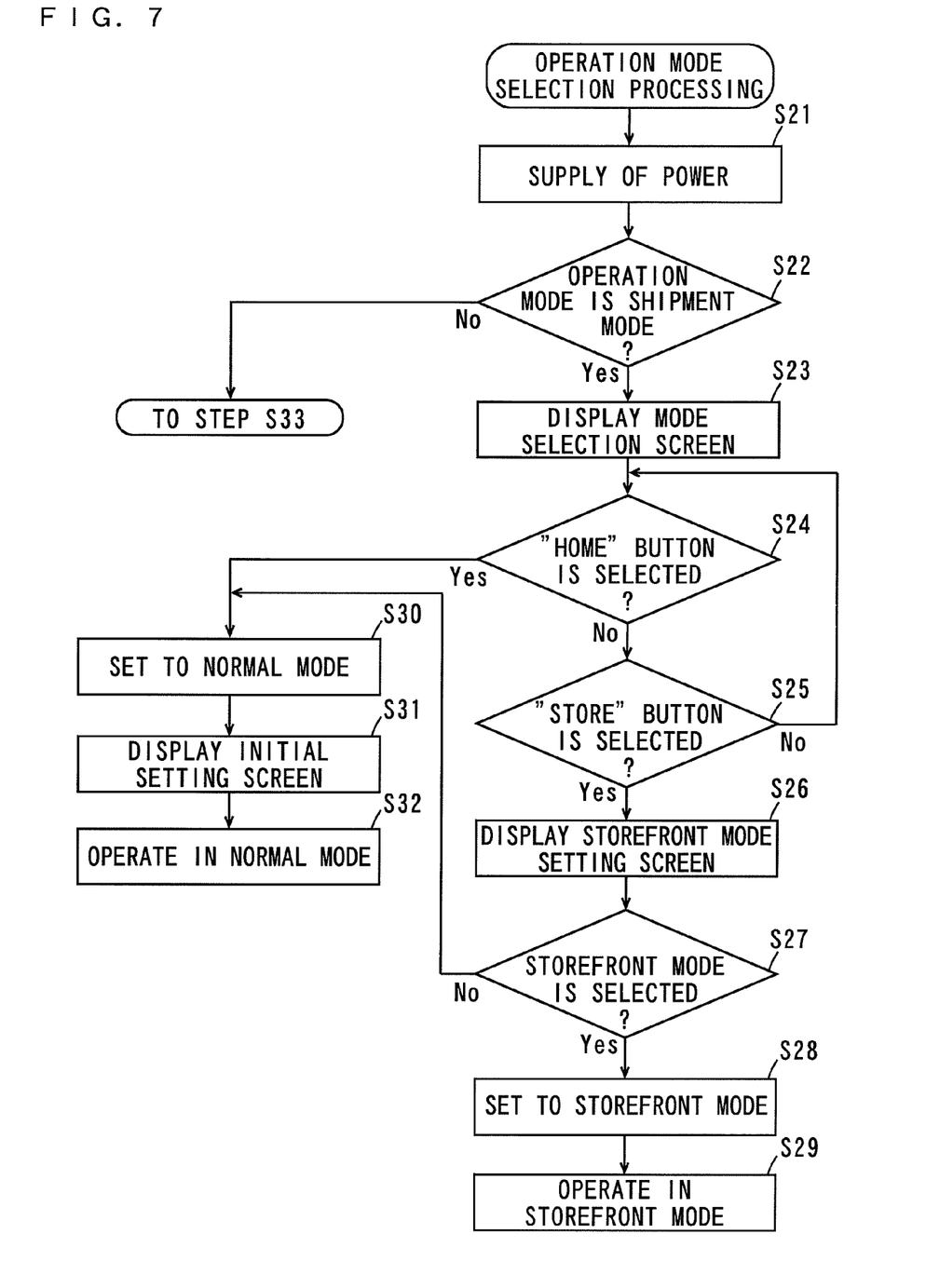
FIG. 7 is a flowchart showing operation mode selection processing by the system controller.
Figure 8:
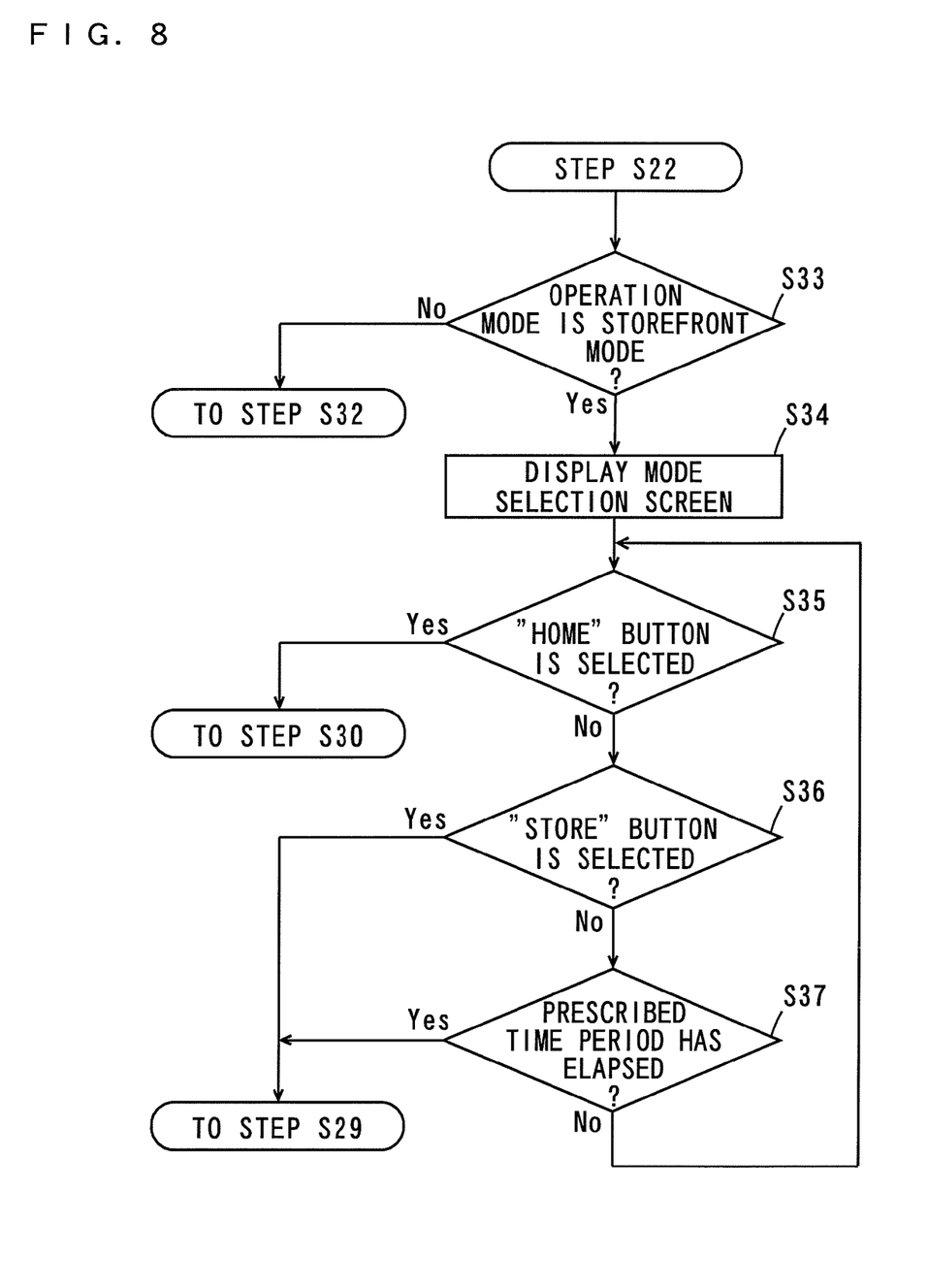
FIG. 8 is a flowchart showing the operation mode selection processing by the system controller.

FIGS. 7 and 8 are flowcharts showing the operation mode selection processing by the system controller 50.

As shown in FIG. 7, when the power supply detector 5 detects supply of power to the television receiver 100, the system controller 50 determines whether or not the operation mode is the shipment mode based on the operation mode information stored in the system memory 11 (Steps S21, S22).

When the operation mode is not the shipment mode, the system controller 50 performs a process of Step S33, described later. When the operation mode is the shipment mode, the system controller 50 causes the mode selection screen D3 of FIG. 6 to be displayed on the video display unit 3 (Step S23).

Then, the system controller 50 determines whether or not the "HOME" button 41 is selected on the mode selection screen D3 (Step S24). When the "HOME" button 41 is selected, the system controller 50 performs a process of Step S30, described later.

When the "HOME" button 41 is not selected, the system controller 50 determines whether or not the "STORE" button 42 is selected (Step S25).

When the "STORE" button 42 is not selected, the system controller 50 repeats the processes of Steps S24 and S25. That is, the system controller 50 causes the mode selection screen D3 to be continuously displayed until either the "HOME" button 41 or the "STORE" button 42 is selected.

When the "STORE" button 42 is selected, the system controller 50 causes the storefront mode setting screen D1 of FIG. 2 to be displayed on the video display unit 3 (Step S26). On the storefront mode setting screen D1, the ON/OFF selection of the storefront mode, the setting of the return state of the output condition and so on are performed by the user, as described above.

The system controller 50 subsequently determines whether or not the storefront mode has been selected on the storefront mode setting screen D1 (Step S27). In this case, the storefront mode is selected by selecting ON, and the normal mode is selected by selecting OFF in the ON/OFF selection portion 21 of the storefront mode setting screen D1. When the storefront mode is selected, the system controller 50 sets the operation mode to the storefront mode (Step S28). This causes the television receiver 100 to operate in the storefront mode (Step S29).

When the "HOME" button 41 is selected in Step S24, or when the normal mode is selected in Step S27, the system controller 50 sets the operation mode to the normal mode (Step S30). Then, the system controller 50 causes an initial setting screen (not shown) for the normal mode to be displayed on the video display unit 3 (Step S31). The user performs language setting, automatic detection (automatic scanning) of a frequency of a channel that can be viewed, or the like on the initial setting screen. This causes the television receiver 100 to operate in the normal mode (Step S32).

When the operation mode is not the shipment mode in Step S22, the system controller 50 determines whether or not the operation mode is the storefront mode (Step S33) as shown in FIG. 8. When the operation mode is not the storefront mode, that is, when the operation mode is the normal mode, the television receiver 100 continues to operate in the normal mode (Step S32). Note that switching from the normal mode to the storefront mode can be performed by the operation using the memory card 7a similarly to the foregoing first embodiment, for example.

When the operation mode is the storefront mode in Step S33, the system controller 50 causes the mode selection screen D3 of FIG. 6 to be displayed on the video display unit 3 (Step S34). Next, the system controller 50 determines whether or not the "HOME" button 41 is selected on the mode selection screen D3 (Step S35). When the "HOME" button 41 is selected, the system controller 50 performs the processes of Steps S30 to S32.

When the "HOME" button 41 is not selected, the system controller 50 determines whether or not the "STORE" button 42 is selected (Step S36). When the "STORE" button 42 is selected, the system controller 50 causes the mode selection screen D3 to be closed while maintaining the operation mode in the storefront mode. Then, the television receiver 100 continues to operate in the storefront mode (Step S29).

Note that the system controller 50 may return to the process of Step S26 and cause the storefront mode setting screen D1 to be again displayed on the video display unit 3 when the "STORE" button 42 is selected.

When the "STORE" button 42 is not selected, the system controller 50 determines based on a value measured by the timer 10 whether or not a prescribed time period (60 seconds, for example) has elapsed since the mode selection screen D3 was displayed (Step S37). Note that the prescribed time period is stored in the system memory 11, for example, in advance.

When the prescribed time period has not elapsed, the system controller 50 returns to the processes of Steps S35 and S36. When the prescribed time period has elapsed, the system controller 50 causes the mode selection screen D3 to be closed while maintaining the operation mode in the storefront mode. Then, the television receiver 100 continues to operate in the storefront mode (Step S29).

In the television receiver 100 according to the present embodiment that is shipped from a factory with its operation mode set to the shipment mode, the mode selection screen D3 for selecting the operation mode is displayed on the video display unit 3 at the time of the first supply of, power. This allows an appropriate operation mode to be more easily set. Particularly, salesclerks can more easily set the operation mode to the storefront mode in retail stores and so on.

The mode selection screen D3 displayed at the time of the first supply of power continues to be displayed until either the "HOME" button 41 or the "STORE" button 42 is selected by the user. That is, the operation mode is not automatically selected as time elapses. This significantly lowers the possibility of erroneous setting of the operation mode.

Every time supply of power is temporarily stopped and then resumed with the operation mode set to the storefront mode, the mode selection screen D3 is displayed on the video display unit. Therefore, when the television receiver 100 set in the storefront mode is delivered to a customer, or when a customer sets the operation mode to the storefront mode by mistake, the customer can easily and reliably switch the operation mode from the storefront mode to the normal mode.

(3) Other Embodiments

In the foregoing first and second embodiments, the television receiver 100 may be set such that its power supply switch is turned on simultaneously with supply of power when the operation mode is set to the storefront mode. In this case, power supply switches of a plurality of television receivers 100 can simultaneously be turned on when power is supplied to the plurality of television receivers 100 at all once by operating a breaker in a retail store, for example. This further reduces workloads of a user who is, for example, a salesclerk.

In the foregoing first and second embodiments, a light emitter such as an LED (Light Emitting Diode) may be provided in the card insertion portion 7, and set so as to constantly light up or blink when the operation mode is set to the storefront mode. Normally, such a light emitter lights up only when the memory card 7a is being inserted. Therefore, such a light emitter is caused to constantly light up or blink in the storefront mode, so that a user such as a customer can be notified that the television receiver 100 can accept the memory card 7a.

While the present invention is applied to the television receiver in the foregoing embodiments, the present invention may be applied to another display device having a display medium such as a monitor device of a personal computer or a DVD (Digital Versatile Disk) reproduction device having a display.

While the memory card 7a is used as a removable storage medium in the foregoing embodiments, another storage medium such as a DVD, a CD (Compact Disk), an IC (Integrated Circuit) card or an IC tag may be used.

The card information detector 9, the timer 10, the system memory 11, the storefront mode executor 12, the OSD processor 13 and the system controller 50 may be implemented by hardware such as an electronic circuit, or part or all of these components may be implemented by hardware such as a CPU and software such as a program.

(4) Correspondences between Elements in the Claims and Parts in Embodiments

In the following paragraph, non-limiting examples of correspondences between various elements recited in the claims below and those described above with respect to various preferred embodiments of the present invention are explained.

In the foregoing embodiments, the audio output unit 2 and the video display unit 3 are examples of an output unit, the remote controller 6a is an example of an operation unit, the normal mode is an example of a first mode, the storefront mode is an example of a second mode, the shipment mode is an example of a third mode, the storefront mode executor 12 and the system controller 50 are examples of a controller, the card insertion portion 7 is an example of a storage medium attachment portion, the memory card 7a is an example of a storage medium, and the power supply detector 5 is an example of a power supply detector.

As each of various elements recited in the claims, various other elements having configurations or functions described in the claims can be also used.

INDUSTRIAL APPLICABILITY

The present invention is applicable to various types of display devices including display media.

The invention claimed is:

1. A display device comprising:
an outputter configured to output at least video;
an operator configured to be operated by a user for adjusting an output condition of said outputter;
a controller configured to selectively control said outputter to be placed in a first mode, where, when the output condition of said outputter is adjusted by an operation of said operator, the output condition of said outputter is maintained in an adjusted state, or in a second mode, where, when the output condition of said outputter is adjusted by an operation of said operator, the output condition of said outputter is shifted to a predetermined state after an elapse of a predetermine time period; and
a storage medium attachment portion to which a storage medium storing information therein is attached in a removable manner, wherein
when said outputter is set in the first mode, said controller causes said outputter to output a selection picture that encourages the user to select either the first mode or the second mode at the time of attachment of the storage medium having the information for selecting between the first mode and the second mode stored therein, to said storage medium attachment portion, and subsequently sets said outputter in the second mode when the second mode is selected by the user.

2. The display device according to claim 1, wherein said storage medium includes a memory card.

3. The display device according to claim 1, wherein
said outputter includes a video display configured to display video, and
the output condition of said outputter includes a state related to a screen of said video display and a state related to a display of video.

4. The display device according to claim 1, wherein
said outputter includes an audio outputter configured to output sound, and
the output condition of said outputter includes a state of an output of sound by said audio outputter.

5. A display device comprising:
an outputter configured to output at least video;
an operator configured to be operated by a user for adjusting an output condition of said outputter;
a controller configured to selectively control said outputter to be placed in a first mode, where, when the output condition of said outputter is adjusted by an operation of said operator, the output condition of said outputter is maintained in an adjusted state, and a second mode, where, when the output condition of said outputter is adjusted by an operation of said operator, the output condition of said outputter is shifted to a predetermined state after an elapse of a predetermine time period; and
a power supply detector configured to detect a supply of power, wherein
when said outputter is set in the second mode, said controller causes said outputter to output a selection picture that encourages the user to select either the first mode or the second mode at the time of detection of the supply of power by said power supply detector, and subsequently sets said outputter in the first mode when the first mode is selected by the user.

6. The display device according to claim 5, wherein said controller stops displaying the selection picture and sets said outputter in the second mode when a selection is not performed by the user within a predetermined time period after the selection picture is output by said outputter.

7. The display device according to claim 5, wherein
said outputter includes a video display configured to display video, and
the output condition of said outputter includes a state related to a screen of said video display and a state related to a display of video.

8. The display device according to claim 5, wherein
said outputter includes an audio outputter configured to output sound, and
the output condition of said outputter includes a state of an output of sound by said audio outputter.

9. A display device comprising:
an outputter configured to output at least video;
an operator configured to be operated by a user for adjusting an output condition of said outputter;
a controller configured to selectively control said outputter to be placed in a first mode, where, when the output condition of said outputter is adjusted by an operation of said operator, the output condition of said outputter is maintained in an adjusted state, in a second mode, where, when the output condition of said outputter is adjusted by an operation of said operator, the output condition of said outputter is shifted to a predetermined state after an elapse of a predetermined time period, and in a third mode for encouraging the user to select either the first mode or the second mode; and
a power supply detector configured to detect a supply of power, wherein
when said outputter is set in the third mode, said controller causes said outputter to output a selection picture that encourages the user to select either the first mode or the second mode at the time of detection of the supply of power by said power supply detector, and subsequently sets said outputter in either the first mode or the second mode based on a selection by the user.

10. The display device according to claim 9, wherein said controller causes said outputter to continuously output the selection picture until either the first mode or the second mode is selected by the user.

11. The display device according to claim 9, wherein said outputter includes a video display configured to display video, and the output condition of said outputter includes a state related to a screen of said video display and a state related to a display of video.

12. The display device according to claim 9, wherein said outputter includes an audio outputter configured to output sound, and the output condition of said outputter includes a state of an output of sound by said audio outputter.

* * * * *